(12) United States Patent
Martin et al.

(10) Patent No.: US 9,168,914 B2
(45) Date of Patent: Oct. 27, 2015

(54) VEHICLE ENGINE AND ELECTRIC MACHINE CONTROL

(71) Applicant: FORD GLOBAL TECHNOLOGIES, LLC, Dearborn, MI (US)

(72) Inventors: Douglas Raymond Martin, Canton, MI (US); Kenneth James Miller, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 9 days.

(21) Appl. No.: 14/154,528

(22) Filed: Jan. 14, 2014

(65) Prior Publication Data

US 2015/0197233 A1  Jul. 16, 2015

(51) Int. Cl.
*B60W 10/04* (2006.01)
*B60W 10/06* (2006.01)
*B60W 10/08* (2006.01)
*B60W 20/00* (2006.01)

(52) U.S. Cl.
CPC .............. *B60W 20/10* (2013.01); *B60W 10/06* (2013.01); *B60W 10/08* (2013.01); *B60W 20/108* (2013.01); *B60W 2540/10* (2013.01); *B60W 2540/106* (2013.01); *Y10S 903/93* (2013.01)

(58) Field of Classification Search
CPC ... B60W 20/10; B60W 20/108; B60W 10/06; B60W 10/08; B60W 2540/10; B60W 2540/106; Y10S 903/93
See application file for complete search history.

(56) References Cited

U.S. PATENT DOCUMENTS

| | | | |
|---|---|---|---|
| 7,229,381 B2 * | 6/2007 | Niessen et al. | 477/3 |
| 7,847,513 B2 * | 12/2010 | Maier et al. | 320/101 |
| 8,285,470 B2 | 10/2012 | Wang et al. | |
| 8,442,711 B2 | 5/2013 | Syed et al. | |
| 8,473,133 B2 | 6/2013 | Wang et al. | |
| 2010/0017054 A1 * | 1/2010 | Okubo et al. | 701/22 |
| 2011/0288709 A1 * | 11/2011 | Maass | 701/22 |

* cited by examiner

*Primary Examiner* — Michael J Zanelli
(74) *Attorney, Agent, or Firm* — David B. Kelley; Brooks Kushman P.C.

(57) ABSTRACT

A vehicle having an engine, an electric machine, a traction battery configured to supply power to the electric machine; and at least one controller is provided. The at least one controller is programmed to apply a filter to a requested engine power. The filter has a filter effect responsive to a difference between an actual and filtered driver demand such that the filter effect increases as the difference decreases to reduce rates of change in engine power output to satisfy the actual driver demand.

16 Claims, 6 Drawing Sheets

VEHICLE ENGINE AND ELECTRIC MACHINE CONTROL

TECHNICAL FIELD

The present disclosure relates to controlling an engine and electric machine in a hybrid-electric vehicle.

BACKGROUND

Vehicles are commonly provided with accelerator pedals. Upon actuation of the accelerator pedal in a vehicle equipped with an internal combustion engine, the engine throttle body permits greater intake air flow. As a result of the increased air flow, fuel flow is increased and the engine combustion rate is increased, resulting in an increased engine speed. In vehicles equipped with an internal combustion engine coupled with an electric machine or generator, actuation of the accelerator pedal may correspond with an overall system output torque. Large actuations of the accelerator pedal result in large changes in overall system output torque, possibly leading to large changes in engine power. Small to medium actuations of the accelerator pedal result in small to medium changes in overall system output torque, possibly leading to small to medium changes in engine speed. These changes in engine power may impact engine fuel efficiency negatively due to the engine operating at an inefficient point.

SUMMARY

A powertrain control system includes a controller that applies a filter to a requested engine power increase having a filter effect responsive to changes in power requests such that the filter effect increases as a difference between the power requests and a filtered power request decreases, reducing a rate of change in engine power to satisfy the power requests. The controller further operates an electric machine based on a difference between the requested engine power increase and the filtered requested engine power.

A vehicle includes an engine, an electric machine, a traction battery configured to supply power to the electric machine, and at least one controller. The at least one controller applies a filter to a requested engine power, with the filter having a filter effect responsive to a difference between an actual and filtered driver demand. The filter effect increases as the difference decreases to reduce rates of change in engine power output to satisfy the actual driver demand.

A method of controlling a hybrid electric vehicle includes applying a filter to an engine power request to generate a filtered engine power request having a filtering effect responsive to a difference between an actual and filtered driver demand such that the filtering effect increases as the difference decreases. The method further includes operating an engine to satisfy the filtered engine power request. The method still further includes operating an electric machine in response to a deficit between the engine power request and the filtered engine power request.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art may understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
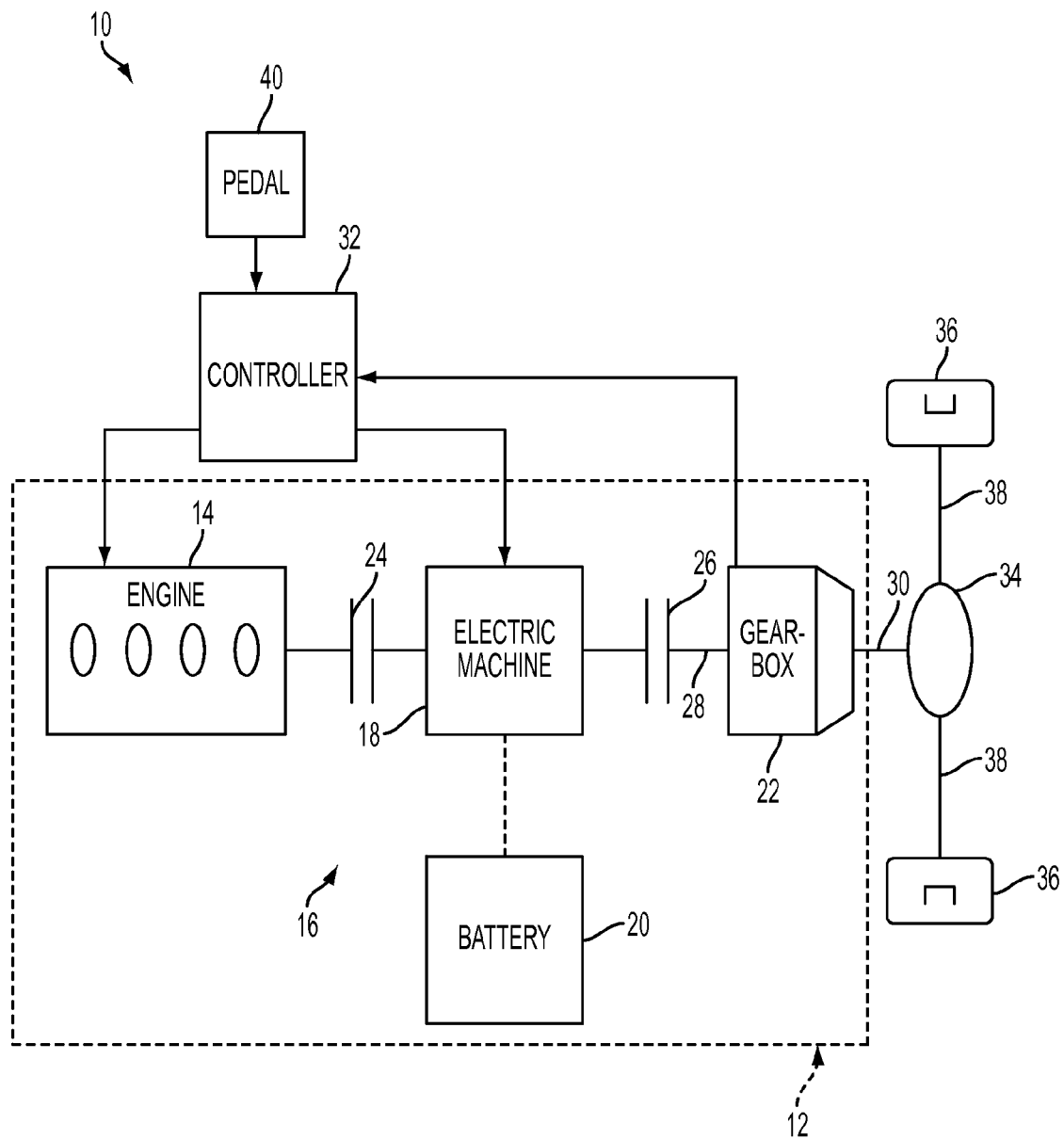
FIG. 1 is a schematic diagram of a hybrid electric vehicle.

FIG. 1 illustrates a schematic diagram of a hybrid electric vehicle (HEV) 10 having representative relationships among the components. The HEV 10 includes a powertrain 12. The powertrain 12 includes an engine 14 that drives a transmission 16, which may be referred to as a modular hybrid transmission (MHT). As may be described in further detail below, the transmission 16 includes an electric machine such as an electric motor/generator 18, an associated traction battery 20, and an automatic transmission, or gearbox 22. Other arrangements are, of course, also contemplated.

The engine 14 and the electric machine 18 are both drive sources for the HEV 10. The engine 14 generally represents a power source that may include an internal combustion engine such as a gasoline, diesel, or natural gas powered engine, or a fuel cell. The engine 14 generates an engine power and corresponding engine torque that is supplied to the electric machine 18 when a disconnect clutch 24 between the engine 14 and the electric machine 18 is at least partially engaged. The electric machine 18 may be implemented by any one of a plurality of types of electric machines. For example, the electric machine 18 may be a permanent magnet synchronous motor. Power electronics (not shown) may condition direct current (DC) power provided by the battery 20 to the requirements of the electric machine 18. For example, power electronics may provide three phase alternating current (AC) to the electric machine 18.

When the disconnect clutch 24 is at least partially engaged, power flow from the engine 14 to the electric machine 18 or from the electric machine 18 to the engine 14 is possible. For example, the disconnect clutch 24 may be engaged and electric machine 18 may operate as a generator to convert rotational energy provided by a crankshaft and electric machine shaft into electrical energy to be stored in the battery 20. The disconnect clutch 24 may also be disengaged to isolate the engine 14 from the remainder of the powertrain 12 such that the electric machine 18 can act as the sole drive source for the HEV 10. Shaft 30 extends through the electric machine 18. The electric machine 18 is continuously drivably connected to the shaft 30, whereas the engine 14 is drivably connected to the shaft 30 only when the disconnect clutch 26 is at least partially engaged.

The electric machine 18 is connected to gearbox 22 through a disconnect clutch 26 and transmission input shaft 28. The gearbox 22 may include gear sets (not shown) that are selectively placed in different gear ratios by selective engagement of friction elements such as clutches and brakes (not shown) to establish the desired multiple discrete or step drive ratios. The friction elements are controllable through a shift schedule that connects and disconnects certain elements of the gear sets to control the ratio between the transmission output shaft 30 and the transmission input shaft 28. The gearbox 22 is automatically shifted from one ratio to another based on various vehicle and ambient operating conditions by an associated controller, such as a vehicle system controller 32. The gearbox 22 then provides powertrain output torque to output shaft 30.

As shown in the representative embodiment of FIG. 1, the output shaft 30 is connected to a differential 34. The differential 34 drives a pair of wheels 36 via respective axles 38 connected to the differential 34. The differential transmits approximately equal torque to each wheel 36 while permitting slight speed differences such as when the vehicle turns a corner. Different types of differentials or similar devices may be used to distribute torque from the powertrain to one or more wheels. In some applications, torque distribution may vary depending on the particular operating mode or condition, for example.

The powertrain 12 further includes an associated vehicle system controller 32. While illustrated as one controller, the vehicle system controller 32 may be part of a larger control system and may be controlled by various other controllers throughout the vehicle 10. It should therefore be understood that the vehicle system controller 32 and one or more other controllers can collectively be referred to as a "controller" that controls various actuators in response to signals from various sensors to control functions such as starting/stopping the engine 14, operating the electric machine 18 to provide wheel torque or charge the battery 20, select or schedule transmission shifts, etc.

The controller 32 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

The controller communicates with various engine/vehicle sensors and actuators via an input/output (I/O) interface that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. As generally illustrated in the representative embodiment of FIG. 1, the vehicle system controller 32 may communicate signals to and/or from the engine 14, disconnect clutches 24 and 26, electric machine 18, transmission gearbox 22, and power electronics (not shown). Although not explicitly illustrated, those of ordinary skill in the art may recognize various functions or components that may be controlled by the controller 32 within each of the subsystems identified above.

Representative examples of parameters, systems, and/or components that may be directly or indirectly actuated using control logic executed by the controller include fuel injection timing, rate, and duration, throttle valve position, spark plug ignition timing (for spark-ignition engines), intake/exhaust valve timing and duration, front-end accessory drive (FEAD) components such as an alternator, air conditioning compressor, battery charging, regenerative braking, electric machine operation, clutch pressures for clutches 24 and 26, and transmission gearbox 22, and the like. Sensors communicating input through the I/O interface may be used to indicate turbocharger boost pressure, crankshaft position (PIP), engine rotational speed (RPM), wheel speeds (WS 1, WS2), vehicle speed (VSS), coolant temperature (ECT), intake manifold pressure (MAP), accelerator pedal position (PPS), ignition switch position (IGN), throttle valve position (TP), air temperature (TMP), exhaust gas oxygen (EGO) or other exhaust gas component concentration or presence, intake air flow (MAF), transmission gear, ratio, or mode, transmission oil temperature (TOT), transmission turbine speed (TS), and deceleration or shift mode (MDE).

Control logic or functions performed by the vehicle system controller 32 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art may recognize that one or more of the illustrated steps or functions may be repeatedly performed depending upon the particular processing strategy being used. Similarly, the order of processing is not necessarily required to achieve the features and advantages described herein. Rather, the order is provided for ease of illustration and description.

The control logic may be implemented primarily in software executed by a microprocessor-based vehicle, engine, and/or powertrain controller, such as the vehicle system controller 32. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

An accelerator pedal 40 may provide a demanded torque, power, or drive command to propel the vehicle. In general, depressing or releasing the accelerator pedal 40 generates an accelerator pedal position signal that may be interpreted by the controller 32 as a demand/request for increased power or decreased power, respectively. The controller 32 may be programmed to determine or calculate efficient engine operating points at a given engine speed and/or power/load level. Efficient engine operating points may be steady state engine operating points at which brake specific fuel consumption (BSFC) is minimized at a given engine speed and/or power level. The controller 32 in a hybrid electric vehicle is able to command torque or power from the engine 14 or the electric machine 18, or a combination of both to provide power to the differential 34 to drive the wheels 36. By adjusting the balance of power between the engine 14 and electric machine 18, the controller 32 is able to improve overall fuel economy by decreasing the loading or power request on the engine 14 and using the electric machine 18.

Real world driver demands may send the engine 14 into inefficient operating points with sub-optimal fuel economy due to small or medium transients in accelerator pedal positions. These transients in accelerator pedal position may be intended by the driver or unintentional changes in pedal position, referred to as a "nervous pedal" or "noisy pedal." Present programming of the controller 32 may send the engine into a higher-power but less efficient state during these transients in pedal position, resulting in more time at inefficient engine operating points. This is due to present programming honoring the pedal position transients to satisfy the driver's expectation of system response with the engine 14. Other methods honor the pedal position transients but limit the wheel torque, which has an unappealing feel to the driver.

A way to improve vehicle fuel economy when small or medium transients in pedal position occur is to apply a smooth engine for fuel economy filter. The controller 32 may heavily filter engine operating points and command the electric machine 18 to handle small to medium transients. Heavy filtering may permit the engine 14 to spend more time at efficient operating points and may minimize fuel consumption. This filtering may be considered a version of adaptive filtering, in which large changes in driver demand may be minimally filtered or not filtered, and small to medium changes in driver demand may be heavily filtered. The filtered driver demand may lead to heavily filtered engine operating points and permits battery power fill-in through the electric machine 18 to meet the driver demand.

Prior to applying the filter to the engine operating points, certain enablement basics may be required. The engine 14 should be on and the controller should calculate or determine a difference between the actual driver demand and the slow filtered version of the actual driver demand below a threshold value. The threshold value may indicate a small or medium transient in driver demand. A small to medium transient in driver demand may be a change in accelerator pedal position in the range of 0-15%. For example, a nervous or noisy pedal may be indicated by an approximate 5% change in accelerator pedal position. A medium transient may be indicated by an approximate 10% change in accelerator pedal position.

These changes in accelerator pedal position may be translated or interpreted by the controller as power requests. These power requests may comprise a total powertrain power output request, which may be split between engine power requests and electric machine power requests. The controller may decide how to allocate the actual powertrain output power between the engine and the electric machine.

Figure 2A:
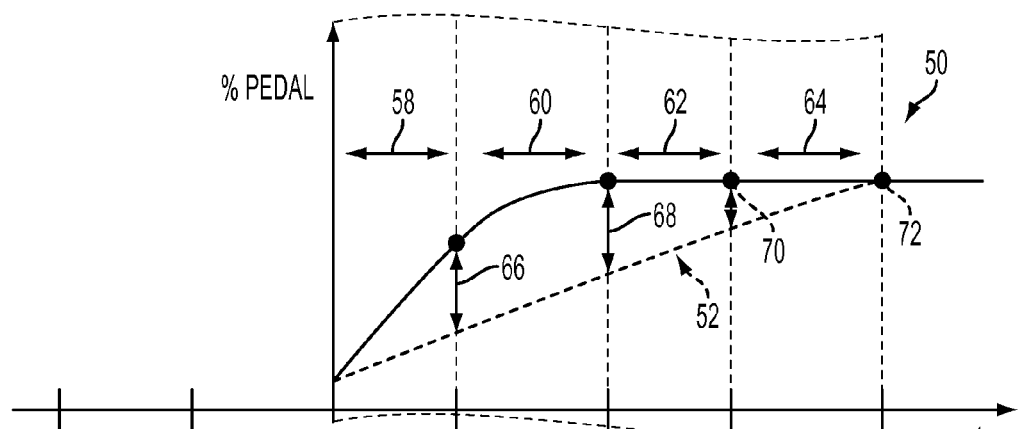
FIGS. 2A through 2C are time plots showing system response to an accelerator pedal input.
Figure 2B:
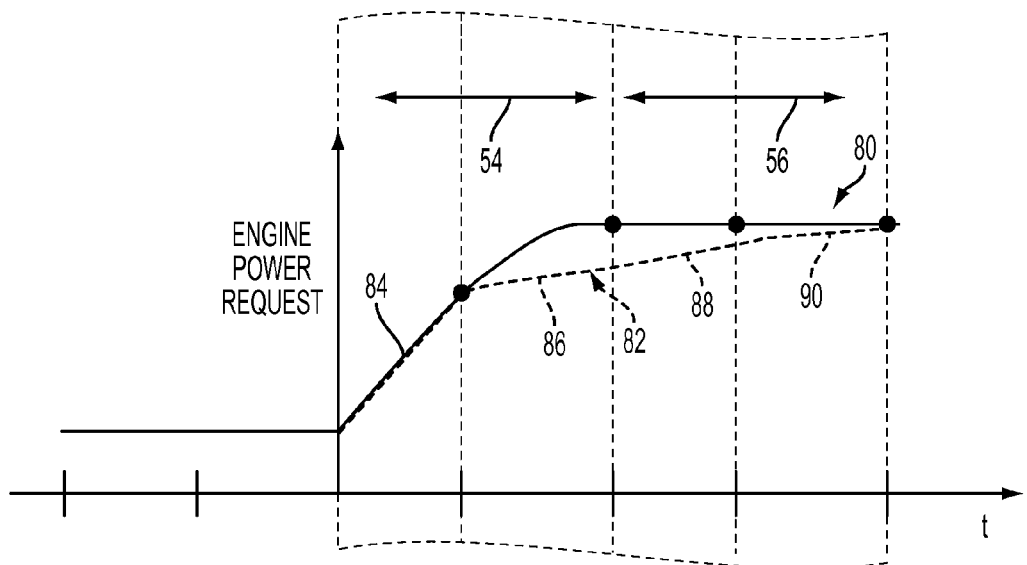
Figure 2C:
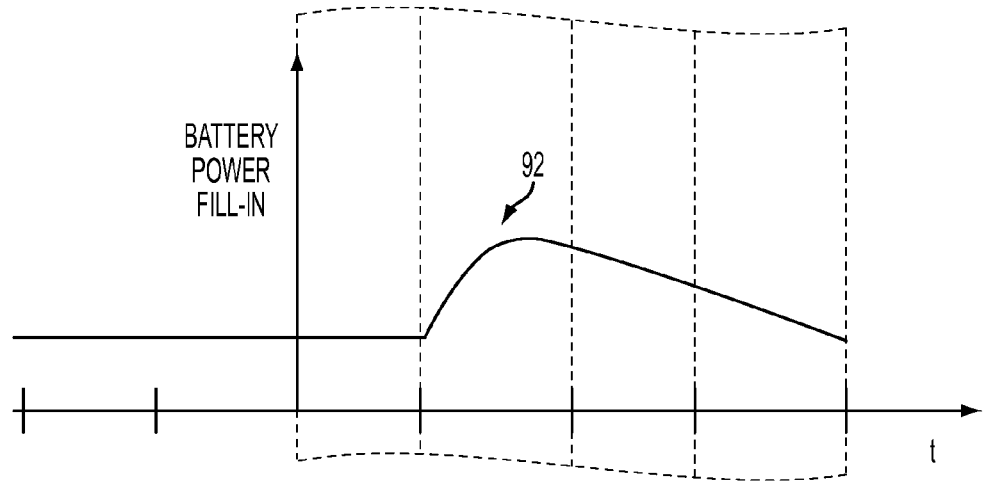

FIGS. 2A through 2C depict a series of corresponding time plots of accelerator pedal input, engine power request, and battery power fill-in respectively. Each plot corresponds in time and shows the smooth engine system response to a medium accelerator pedal input transient.

FIG. 2A is a plot of a medium accelerator pedal input transient versus time. The actual driver demand/pedal input is depicted as curve 50. The actual driver demand 50 is increased by a driver over a first time period 54 and remains constant for a second time period 56 in the current example. The controller receives the actual driver demand 50 and provides a slow filtered version of the actual driver demand depicted as curve 52. The slow filtered version 52 of the actual driver demand 50 may be a rolling (moving) average of the actual driver demand 50, subject to a time constant. The slow filtered version 52 may eventually reach the actual driver demand 50. The filter, however, smooths the driver demand to reduce or eliminate the slope of the actual driver demand 50. As stated previously, this driver demand may be considered a power request by the controller.

The controller may analyze or calculate the difference between the actual driver demand 50 and the slow filtered version 52 at a plurality of sampling period 58, 60, 62 and 64. The controller may be programmed to analyze the difference at more than four sampling points or less than four sampling points. The four sampling periods are provided as an example of the general operation of the controller and how the system handles differences in the actual driver demand and the slow filtered version. For example, during sampling period 58 the difference between the actual driver demand and the slow filtered version is $\Delta_1$ 66. During sampling period 60, the difference between the actual driver demand and the slow filtered version is $\Delta_2$ 68. During sampling period 62, the difference between the actual driver demand and the slow filtered version is $\Delta_3$ 70. Lastly during sampling period 64, the difference between the actual driver demand and the slow filtered version is $\Delta_4$ 72. The controller then utilizes these differences in adjusting a filter applied to the engine power request.

As one skilled in the art well knows, engine power is a function of engine torque and engine speed. Therefore, the controller may be programmed to apply a filter to the requested engine torque and/or the requested engine speed, which would have the same effect as a applying a filter to requested engine power.

In certain situations an additional enablement basic should be satisfied: the engine should reach a steady state operating point. This is to ensure that a hybrid electric vehicle operating in electric mode does not prevent or slow down engine restart if the filter is applied. However, this enablement basic is not required if the controller is applying the filter to requested engine power increases based on a difference between power requests and filtered power requests.

FIG. 2B is a corresponding time plot of the effect of the filter on the engine power request versus time. If a filter was not applied, the engine power request may follow curve 80 to satisfy the actual driver demand. If the filter is in effect, the rate of change of the engine request is decreased and may follow curve 82 to satisfy the actual driver demand, utilizing the differences between the actual driver demand and the slow filtered version of the actual driver demand. The filter on the engine power request may be a low pass filter, configured to reduce the filtering effect (lightly filter to no filter) as the differences between the actual driver demand and the slow filtered version of the actual driver demand increases. The low pass filter is further configured to increase the filtering effect (more heavily filter) based on smaller differences between the actual driver demand and the slow filtered version of the actual driver demand. The filter may be further configured to increase the effect of filtering as the differences between the actual driver demand and the slow filtered version of the actual driver demand decreases.

The filter may have continuous filtering effect in proportion to the driver demand. The filter on engine power may also be considered a two-sided filter providing a first filtering response to a first magnitude of driver demand, such as a pedal position increase (pedal tip-in), and that provides a second filtering response to a second magnitude of driver demand, such as a pedal position decrease (pedal tip-out). Although a low-pass filter and a two-sided filter is described, it should be appreciated that alternative filter topologies may be suitable to modify engine power requests to improve fuel economy as well as for other purposes. Other such filter types may also be provided with variable time constants and filtering effects.

In this example, $\Delta_1 > \Delta_2 > \Delta_3 > \Delta_4$. Therefore, the filtering effect increases as the differences between the actual driver demand and the slow filtered version of the actual driver demand decreases. The line segments of the filtered engine power request curve 82 are depicted as discrete line segments 84, 86, 88 90, and may correspond with the time periods associated with the sampling points 58, 60, 62, 64 of FIG. 2A. As such, due to the increased filtering effect responsive to the differences between the actual driver demand and the slow filtered version of the actual driver demand, the slope of line segment 84 is steeper than the slope of line segment 86, which in turn is steeper than the slope of line segment 88, which is steeper in slope than line segment 90.

The decreasing slope of the line segments indicates the increasing filtering effect of the filter, which is responsive to the differences between the actual driver demand and the slow filtered copy of the actual driver demand. The filter may be applied subject to a variable time constant. The filter time constant may be reduced in response to a difference between the actual driver demand and the slow filtered version of the actual driver demand exceeding a threshold value. For example, if the difference between the actual driver demand and the slow filtered version exceeds 15%, the time constant may be reduced. The time constant may also be reduced in response to accelerator pedal tip-out (release of accelerator pedal) or braking events (applying the brakes). Conversely, the time constant may be increased in response to a difference between the actual driver demand and the slow filtered copy of the actual driver demand falling below a threshold value.

The controller is further programmed to calculate/determine a difference between the engine power request curve 80 and the filtered engine power request curve 82. This difference indicates a deficit between the engine power output due to the filter reducing the rate of change of the engine power output. Therefore, the controller may attempt to schedule or command the traction battery to provide fill-in power to the electric machine to satisfy the deficit. This may permit the engine to remain at efficient operating points as the engine power is smoothly increased to another efficient operating point.

FIG. 2C is a plot of the effect of the filter on battery power fill-in versus time. Curve 92 represents the battery power fill-in in response to the deficit between the engine power request and the filtered engine power request. During the first sampling period 58, the battery power may not be scheduled or commanded to provide battery fill-in power if the engine power request and the filtered engine power request curves are parallel to each other as depicted in FIG. 2B during the first sampling period 58.

The battery power may be scheduled or demanded to provide battery power fill-in to the electric machine in response to the largest difference between the engine power request and the filtered engine power request during the second sampling period 60. Battery power fill-in may be additional power supplied to the electric machine above the currently commanded/scheduled battery power delivered to the electric machine. The scheduled battery power fill-in to the electric machine may begin to decrease in response to the difference between the engine power request and the filtered engine power request during the third sampling period 62. The scheduled battery power fill-in to the electric machine is further reduced in response to the difference between the engine power request and the filtered engine power request further decreasing during the fourth sampling period 64. The battery power fill-in is decreased as the engine power output is increased to meet the actual driver demand.

Figure 3:
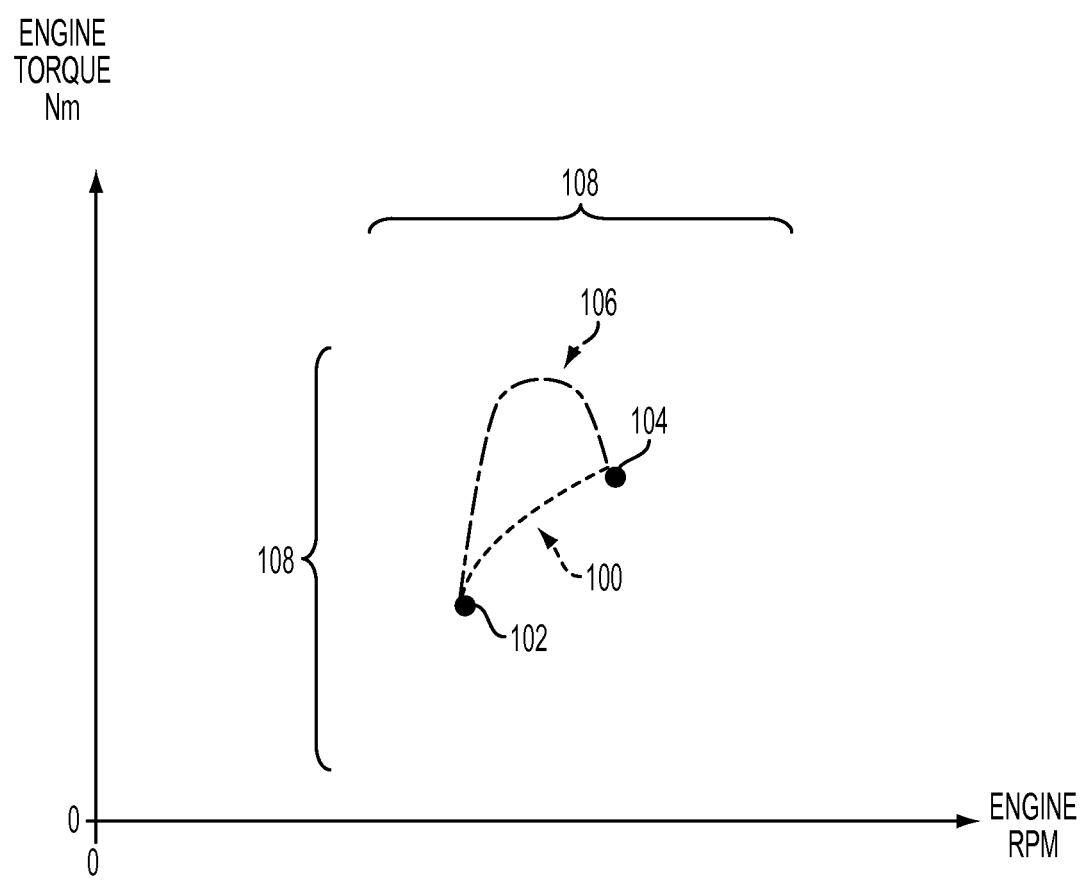
FIG. 3 is a graph depicting smooth engine response to an accelerator pedal input.

FIG. 3 depicts a plot of the engine speed and engine torque response when the engine power request is filtered. The use of the battery to provide battery power fill-in may permit the engine power output to be increased slowly or smoothly along curve 100 from a first steady operating point 102 to a second steady operating point 104. The filter may be applied when the engine is operating within the smooth engine control window 108. These steady operating points 102, 104 may be calibrated by the controller to maintain the engine at an efficient point during the transition from steady operating point 102 to steady operating point 104, based on various engine performance parameters including engine speed, engine load and fuel consumption.

As the engine power output is increased, the controller may attempt to maintain an efficient operating point along curve 100 by slowly increasing engine speed or engine load to achieve an optimum fuel consumption at the given engine speed or engine load. When the engine power request is not filtered, the engine operating points may move to provide engine output power following curve 106. The filter may permit the engine to operate smoothly and may optimize battery power usage to improve fuel economy during small to medium transients.

Figure 4A:
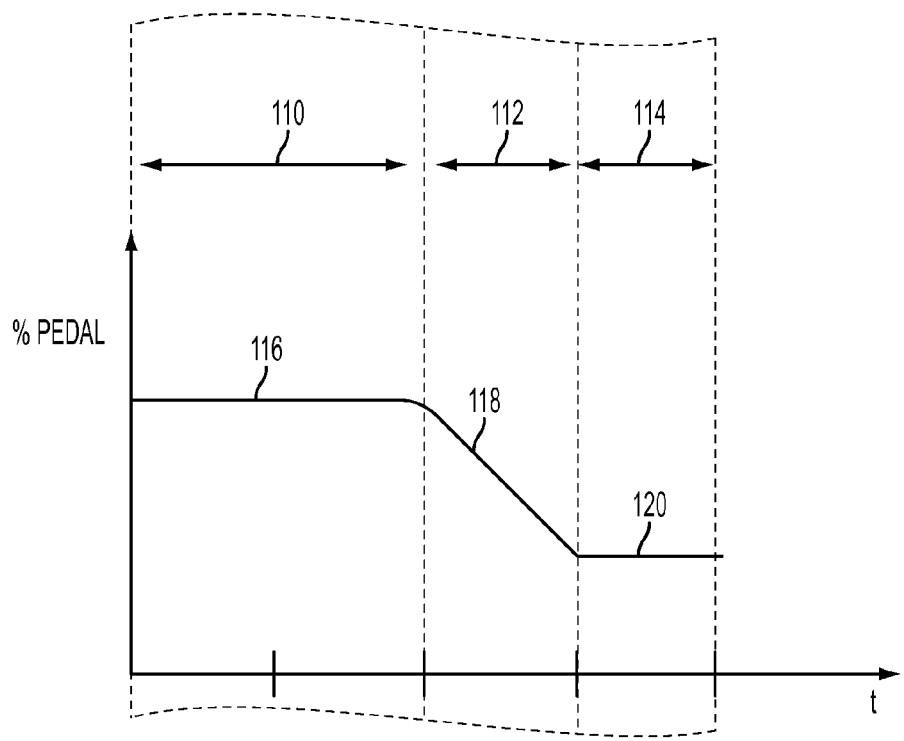
FIGS. 4A and 4B are time plots showing system response to an accelerator pedal input.
Figure 4B:
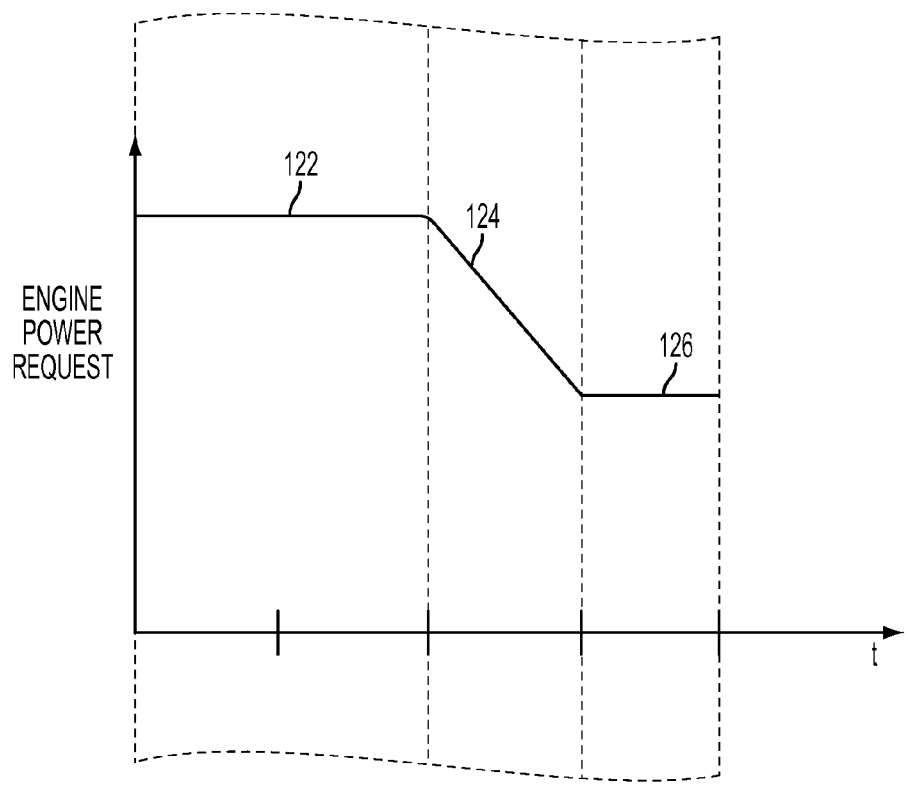

FIGS. 4A and 4B depict a series of corresponding time plots of accelerator pedal input and engine power request. FIG. 4A represents an accelerator pedal input. During a first time period 110, the actual driver demand remains constant along line segment 114. An accelerator pedal tip-out occurs during time period 112 along line segment 116, reducing the actual driver demand. The actual driver demand is held steady at a reduced level during time period 114 along line segment 120.

FIG. 4B is a corresponding time plot of the effect of the filter on the engine power request versus time. The engine power request tracks with a nearly direct correlation to actual driver demand and may proportionally respond to the accelerator pedal tip out. During the first time period 110, the engine power request remains constant with the actual driver demand along line segment 122. The engine power request reduces during time period 112 along line segment 124, corresponding to the accelerator pedal tip-out. The engine power request is held steady during time period 114 along line segment 126.

Figure 5A:
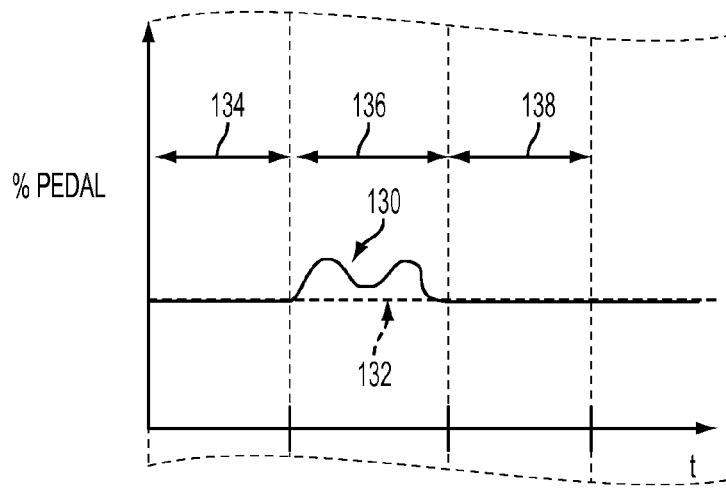
FIGS. 5A through 5C are time plots showing system response to a nervous pedal input.
Figure 5B:
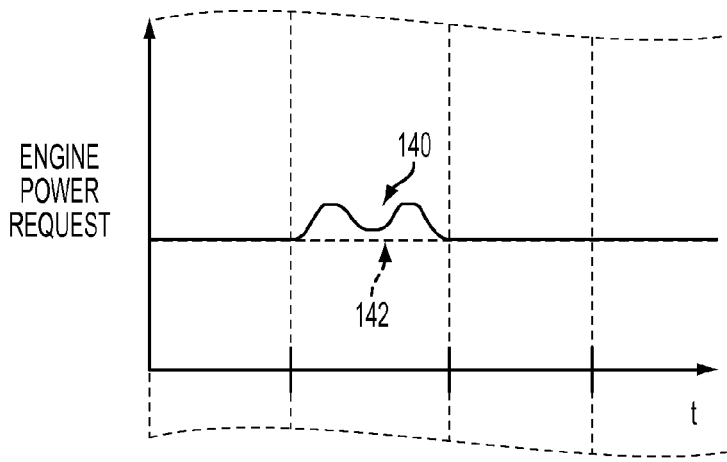
Figure 5C:
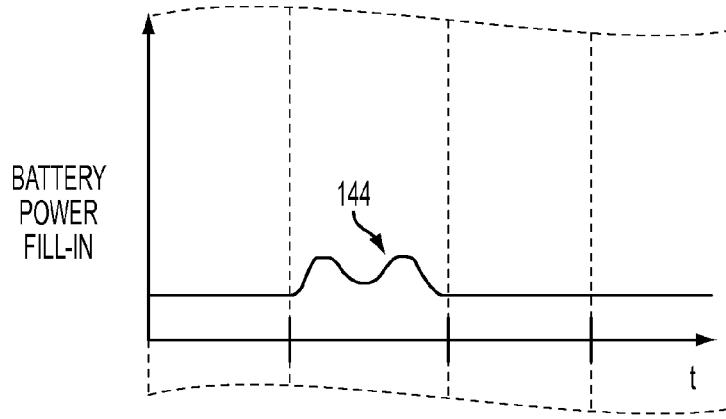

FIGS. 5A through 5C depict a series of corresponding time plots of accelerator pedal input, engine power request, and battery power fill-in. Each correspond in time and demonstrate a smooth engine system response to a small accelerator pedal input transient. FIG. 5A is a plot of actual driver demand versus time. Curve 130 represents a driver input showing a small transient or perturbation in actual driver demand as a result of a noisy or nervous accelerator pedal. Curve 132 represents the filtered driver input. During time period 134, the actual driver demand remains steady. During time period 136, a nervous or noisy pedal transient occurs. Lastly during time period 138, the actual driver demand remains steady.

FIG. 5B is a corresponding time plot of the effect of the filter on the engine power request versus time. Curve 140 represents the actual engine power request which corresponds to the actual driver demand without applying the filter. Curve 142 represents the filtered engine power request. Due to the perturbations in actual driver demand indicating a small transient during time period 136, the controller heavily filters the engine power request—removing or minimizing the small transient. The filtered engine power request prevents the engine operating point from changing, and flattens or smooths the small transients.

FIG. 5C is a time plot of the battery power fill-in versus time. Curve 144 represents battery power fill-in in response to the small transient. During the first time period 134, the controller does not command or schedule battery power fill-in. During the second time period 136, the battery power fill-in is commanded to respond to the small transients as a result of the noisy pedal. During time period 138, the battery power fill-in is reduced or removed in response to the end of the small transient.

Figure 6:
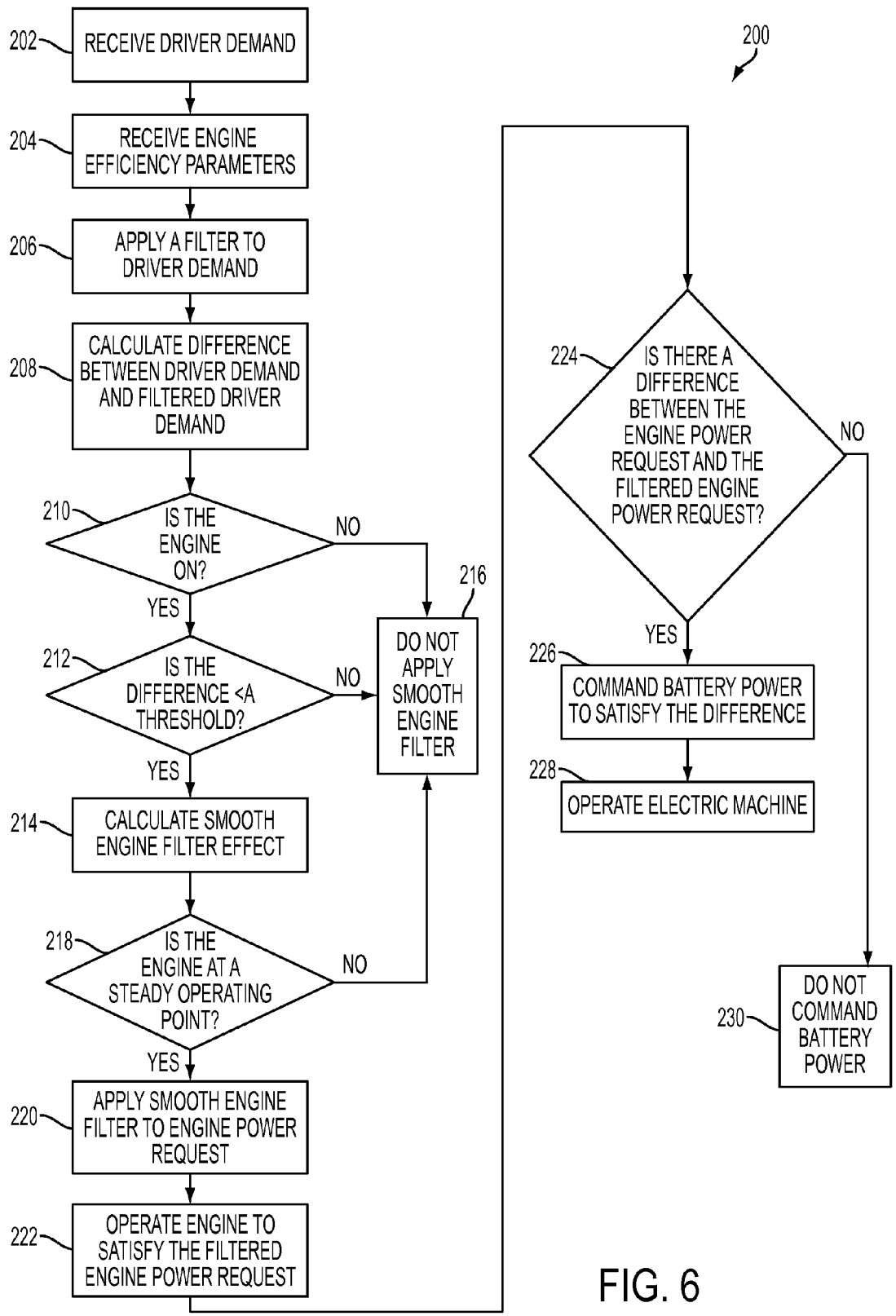
FIG. 6 is a flow chart of an algorithm for engine and electric machine control.

An algorithm is provided to improve engine fuel economy by smoothly transitioning the engine from a first steady operating point to a second steady operating point by heavily filtering requested engine power. FIG. 6 depicts a method 200 representative of an embodiment of the smooth engine control logic of the controller to implement the algorithm. The smooth engine control logic may use as inputs the driver demand 202 via the accelerator pedal, as well as operating parameters indicative of engine efficiency 204.

The method 200 may include applying a filter to the received driver demand 206. The filter may create a slow filtered version of the driver demand that may be a rolling average of the received driver demand subject to a time constant. The smooth engine control logic may calculate a difference between the received driver demand and the filtered driver demand 208. Based on this difference, a smooth engine filter may be applied by the controller.

Prior to applying a smooth engine filter, certain enablement requirements may be satisfied. The engine status 210, for example, should be evaluated. If the engine is not on or operable, the logic may wait for further driver demand and may not apply the smooth engine filter 216. Should the engine be on or operable, the difference between the driver demand and the filtered driver demand is compared to a threshold value 212. If the difference is less than a threshold value, a filter effect is calculated 214. The filter effect is calculated based on the magnitude of the difference between the driver demand and the filtered driver demand. The smooth engine filter may apply a greater filtering effect to a smaller difference and a lesser filtering effect to a larger difference, if the difference is below a threshold value. Should the difference between the driver demand and the filtered driver demand be greater than the threshold value, the smooth engine filter may not be applied 216.

The method may include a further enablement requirement that evaluates whether the engine is operating at a steady operating point 218. This steady operating point may be an engine operating point at which engine efficiency is optimized at a given engine speed and engine load, or indicate that the engine is not in a transient state. A transient state of the engine may include fluctuations in engine speed or engine load. If the engine is not at a steady operating point, the smooth engine filter may not be applied 216. Should the engine be operating at a steady operating point, the smooth engine filter may be applied to an engine power request 220.

At step 220, the smooth engine filter applied to the engine power request may attempt to smooth or flatten the engine power request curve. The smoothing or flattening of the engine power request curve results in a reduction in the rate of change of the engine power output. This reduction in the rate of change may decrease the rate at which the engine speed or engine torque may be increased to satisfy the engine power request. The reduction in the rate of change may assist in improving engine fuel economy. The engine may then be operated to satisfy the filtered engine power request 222. This operation of the engine may smoothly increase the engine power output until the engine reaches the engine power request or a second steady operating point that satisfies the engine power request.

The method 200 further evaluates the difference between the engine power request and the filtered engine power request 224. Should there be a difference between the engine power request and the filtered engine power request, the traction battery may be commanded or scheduled to provide battery power fill-in to the electric machine to satisfy the difference 226. The difference may be such that more engine power is requested than the filtered engine power request is able to provide. If there is not a difference between the engine power request and the filtered engine power request, battery power fill-in may not be commanded or scheduled 230.

In order to apply the additional battery power fill-in to satisfy the difference, the battery power may be sent to the electric machine which is then operated 228 according to the smooth engine logic. The battery power fill-in may then be reduced in response to the engine power output increasing to satisfy the filtered engine power request/engine power request. This may provide an approximately inverse relationship between battery power fill-in and engine power output during operation of the smooth engine filter.

The control algorithms described herein may improve vehicle operating performance in several ways. Improved fuel economy may result by reduction in the rate of change of the engine power output. Improved fuel economy may also result from the quickened response to accelerator pedal position changes for pedal tip-out. Additionally, the driver may still feel the vehicle acceleration without having the engine operate in an efficient manner during small and medium driver demand transients.

The present disclosure provides representative control strategies and/or logic that may be implemented using one or more processing strategies such as event-driven, interrupt-driven, multi-tasking, multi-threading, and the like. As such, various steps or functions illustrated herein may be performed in the sequence illustrated, in parallel, or in some cases omitted. Although not always explicitly illustrated, one of ordinary skill in the art may recognize that one or more of the illustrated steps or functions may be repeatedly performed depending upon the particular processing strategy being used. Similarly, the order of processing is not necessarily required to achieve the features and advantages described herein, but it is provided for ease of illustration and description.

The control logic may be implemented primarily in software executed by a microprocessor-based vehicle, engine, and/or powertrain controller. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A powertrain control system comprising:
a controller programmed to
apply a filter to a requested engine power increase having a filter effect responsive to changes in power requests such that the filter effect increases as a difference between the power requests and a filtered power request decreases, reducing a rate of change in engine power to satisfy the power requests, and
operate an electric machine based on a difference between the requested engine power increase and filtered requested engine power.

2. The powertrain control system of claim 1, wherein the controller is further programmed to provide an engine control window in which the filter may be applied to a requested engine power increase based at least on an engine speed and engine torque range and a change in power requests less than a threshold.

3. The powertrain control system of claim 1, wherein the filter effect is a function of a filter time constant and wherein the filter time constant is varied in response to changes in power requests such that a filter constant increases as changes in power requests decrease.

4. The powertrain control system of claim 1, wherein the filter effect is a function of a filter time constant and wherein the filter time constant is varied in response to changes in power requests, such that a filter time constant decreases as changes in power requests increase.

5. A vehicle comprising:
an engine;
an electric machine;
a traction battery; and
a controller programmed to
apply a filter, having a filter effect responsive to a difference between actual and filtered driver demands, to a requested engine power such that the filter effect increases as the difference decreases to reduce engine power output rates of change to satisfy the actual driver demand, and
command traction battery power for the electric machine based on the difference.

6. The vehicle of claim 5, wherein the controller is further programmed to cause the electric machine to output power based on a difference between the requested engine power and the engine power output to satisfy the actual driver demand.

7. The vehicle of claim 5, wherein the filtered driver demand is a rolling average of the actual driver demand.

8. The vehicle of claim 5, wherein the filter is a two sided filter having a first filter effect in response to increases in power requests and a second filter effect in response to decreases in power requests.

9. The vehicle of claim 5, wherein the filter effect is reduced in response to the difference exceeding a threshold value.

10. The vehicle of claim 5, wherein the filter is applied to the requested engine power when the engine has achieved a first steady operating point and the difference is less than a threshold.

11. The vehicle of claim 10, wherein the filter is applied to the requested engine power as the engine power output is increased during a transition from the first steady operating point to a second steady operating point such that the actual driver demand is satisfied.

12. A method comprising:
applying a filter to an engine power request to generate a filtered engine power request having a filtering effect responsive to a difference between an actual and filtered driver demand such that the filtering effect increases as the difference decreases;
operating an engine to satisfy the filtered engine power request; and
operating an electric machine in response to a deficit between the engine power request and the filtered engine power request.

13. The method of claim 12, wherein when operating the electric machine, the electric machine receives battery power to satisfy the deficit between the engine power request and the filtered engine power request.

14. The method of claim 13, wherein engine power output is increased and battery power is decreased in response to the deficit between the engine power request and the filtered engine power request decreasing.

15. The method of claim 14 further comprising
receiving a signal indicative of the engine operating at a second steady operating point; and
awaiting a change in driver demand.

16. The method of claim 12, further comprising receiving a signal indicative of the engine operating at a first steady operating point.

* * * * *